United States Patent [19]
Rebentisch

[11] Patent Number: 4,575,295
[45] Date of Patent: Mar. 11, 1986

[54] FASTENER FOR CHANNELED STRUCTURAL MEMBERS

[75] Inventor: Hugo E. Rebentisch, Wayne, Mich.

[73] Assignee: GTE Products Corporation, Stamford, Conn.

[21] Appl. No.: 569,950

[22] Filed: Jan. 11, 1984

[51] Int. Cl.$^4$ ............................................. F16B 39/00
[52] U.S. Cl. ........................................ 411/85; 411/427
[58] Field of Search ................... 411/84, 83, 85, 104, 411/401, 427; 403/348, 405, 406

[56] References Cited

U.S. PATENT DOCUMENTS

| | | | |
|---|---|---|---|
| 2,696,139 | 12/1954 | Attwood | 411/427 |
| 2,784,930 | 3/1957 | Wernecke | 411/427 X |
| 3,049,161 | 8/1962 | Attwood | 411/81 |
| 3,053,355 | 9/1962 | Attwood | 411/176 X |
| 3,370,144 | 2/1968 | Arthur | 403/348 X |
| 3,483,910 | 12/1969 | Lalonde | 411/103 X |
| 3,493,025 | 2/1970 | Lalonde | 411/85 X |
| 3,908,330 | 9/1975 | Frach | 403/348 X |
| 4,143,984 | 3/1979 | Danescu | 403/348 X |
| 4,146,074 | 3/1979 | Kowalski | 411/111 |
| 4,285,379 | 8/1981 | Kowalski | 411/85 |
| 4,315,393 | 2/1982 | Schack | 411/427 X |

FOREIGN PATENT DOCUMENTS 962312 7/1964 United Kingdom ............... 411/427

Primary Examiner—Kenneth J. Dorner
Assistant Examiner—Adrian H. Whitcomb, Jr.
Attorney, Agent, or Firm—Ivan L. Ericson

[57] ABSTRACT

A fastener for attaching fixtures to channeled structural members has an extended bolt engaging section which increases the load carrying capacity of the fastener. The fastener, with the extended section, can be used in channeled structural members of limited depth as well as the standard channeled structural members without sacrificing the load carrying capacity. The extended section has an alignment feature which will align the flanges of the channeled structural member with the grooved flange engaging means of the fastener permitting the use of the fastener in channeled structural members having widths greater than standard members.

7 Claims, 16 Drawing Figures

FASTENER FOR CHANNELED STRUCTURAL MEMBERS

FIELD OF THE INVENTION

This invention relates to fasteners primarily for a specific use but capable of a more general use. More particularly, this invention relates to fasteners intended for securing fittings or other items to channeled structural members.

BACKGROUND OF THE INVENTION

A known channeled structural member consists of a rectangular metal member having in one face a longitudinal slot bordered by inwardly projecting flanges. In the use of this channeled structural member, fittings of various kinds are secured to the slotted face by arranging within the channel a fastener adapted to cooperate with a screw or bolt passing through the fitting and into the fastener.

Variations of fasteners for this purpose are described in U.S. Pat. No. 3,483,910 to LaLonde et al. One variation has various arrangements mounted on the top surface of the fastener for holding the fastener against the channel flanges. Another variation has a square configuration with upper portions of the corners removed to provide landings for engaging the channel flanges and slots for receiving an indexing tool to facilitate alignment of the fastener.

Another variation, described in U.S. Pat. No. 2,696,139 to Attwood, is provided with grooves equispaced with the inturned flanges of the above-mentioned channel and provided with teeth in the grooves. The fastener is also provided with a spring to hold the fastener against the channel flanges prior to affixing parts to the channel member. A variation is described in U.S. Pat. No. 3,049,161 to Attwood. This variation has teeth in a groove on one side of the fastener surface and a sharp edge on the other side thereof. U.S. Pat. No. 3,053,355 to Attwood describes a fastener with sharp edges on both sides of the fastener for gripping the channel flanges.

Other references which disclose fasteners for securing parts to channel members are U.S. Pat. No. 3,493,025 of LaLonde et al., U.S. Pat. No. 4,146,074 of Kowalski, and U.S. Pat. No. 4,285,379 of Kowalski.

The many variations of fasteners for securing fittings to a channeled structural member have various features, but none have provisions for properly positioning a given fastener in channeled structural members having different widths between the side walls but having constant slot widths. Nor do any have fasteners with a bolt holding capacity equivalent to the fasteners used in standard channeled structural members, and the capacity of being used in channeled structural members having an inside depth clearance less than the overall thickness of the fastener.

SUMMARY OF THE INVENTION

In accordance with the present invention, a new and improved fastener used for affixing parts to a channeled structural member has an improved bolt engaging means for properly positioning the fastener in channeled structural members of different widths but with the same slot width and having a bolt holding capacity equivalent to fasteners used in standard channeled structural members and having the capability of being used in channeled structural members having an inside depth clearance less than the overall thickness of the fastener.

The channeled structural member has a depth, a width, a bottom section, two parallel side sections being spaced apart by a distance between said side sections, and a top section parallel with the bottom section. The top section has a longitudinal slot bordered by inwardly projecting flanges. The flanges each have an end portion and the flanges are spaced apart by a slot width distance.

The new and improved fastener comprises a nut having a depth, a width, a length longer than its width, opposite parallel longitudinal side surfaces, end surfaces, a top major face, and an opposite bottom major face substantially perpendicular to the side surfaces. The nut has parallel grooves located on the top major face perpendicular to the parallel longitudinal side surfaces. The parallel grooves have flange engaging means therein for engaging the end portion of the flanges of the channeled structural member. The parallel grooves are spaced apart and centered on the top major face for co-acting with the flanges of the channeled structural member. The longitudinal side surfaces are contiguous with the end surfaces forming a first and a second set of diagonally opposite corners. The first set of diagonally opposite corners are foreshortened and are spaced apart by a first set diagonal dimension. The first set diagonal dimension is sufficiently less than the distance between the parallel side sections of the channeled structural member to provide clearance between the first set of diagonally opposite corners and the parallel side sections during installation of the nut. The nut has a centrally located bolt engaging means having an extended portion above the top major face of the nut. The nut has an overall thickness equal to the depth of the nut plus the extended portion. The extended portion has two sets of opposite parallel extended sides. The two sets of opposite parallel extended sides are contiguous with each other forming a third and a fourth set of diagonally opposite corners. The third set of diagonally opposite corners are foreshortened and are spaced apart by a third set diagonal dimension. The third set diagonal dimension is sufficiently less than the slot width distance of the channeled structural member to provide clearance between the third set of diagonally opposite corners of the extended portion and the flanges of the channeled structural member during installation of the fastener. The fourth set of diagonally opposite corners co-act with the flanges during the installation of the fastener providing an alignment of the parallel grooves of the nut with the end portion of the flanges of the channeled structural member.

In another aspect of the invention, a spring is arranged normal to the bottom major face of the nut and attached by a spring attachment means located on the bottom major face of the nut for attaching a tang of the spring to the nut.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

Figure 1:
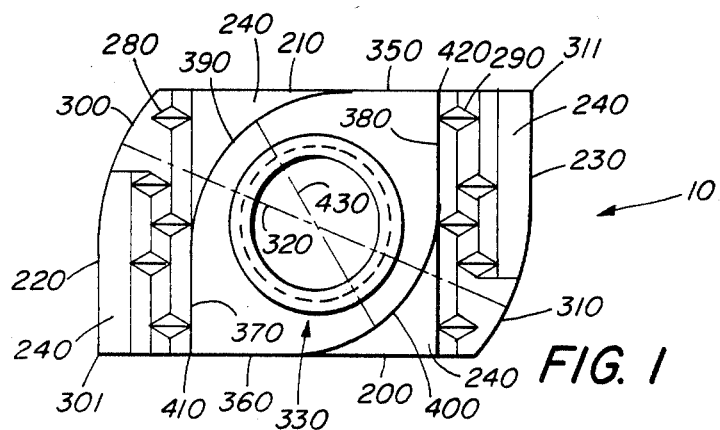
FIG. 1 is a top view of a fastener; illustrating one embodiment of the present invention.
Figure 2:
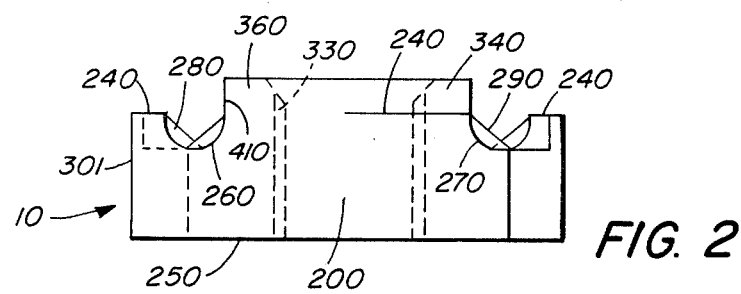
FIG. 2 is a side view of the fastener illustrated in FIG. 1.
Figure 3:
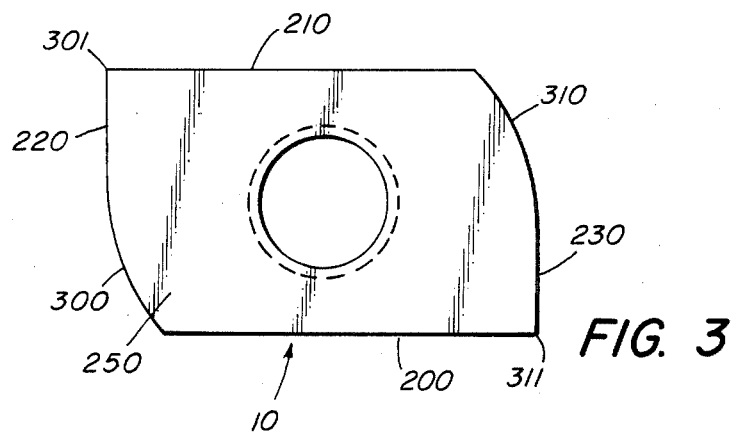
FIG 3 is a bottom view of the fastener illustrated in FIG. 1.
Figure 4:
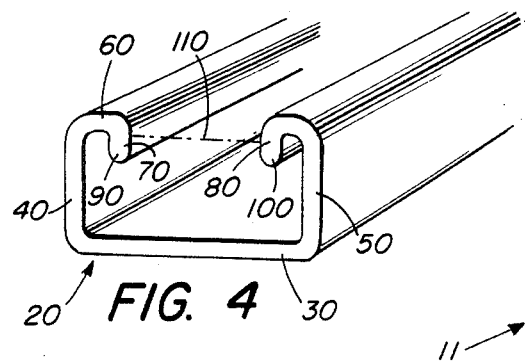
FIG. 4 is an isometric view of a fragment of a channeled structural member of limited depth of the type for which the fastener of the present invention is particularly adapted.

Referring to the drawing figures, shown in FIGS. 1, 2 and 3 are illustrative views of a nut 10 in accordance with one embodiment of the invention. In FIG. 4 there is shown an isometric view of a fragment of a channeled structural member 20 of limited depth of the type for which the nut 10 is particularly adapted.

The channeled structural member 20 (FIG. 4) has a depth, a width, a bottom section 30, two parallel side sections 40 and 50 being spaced apart by a distance between said side sections 40 and 50, and a top section 60, parallel with the bottom section 30. The top section 60 has a longitudinal slot bordered by inwardly projecting flanges 70 and 80. The flanges 70 and 80 have end portions 90 and 100 and the flanges 70 and 80 are spaced apart by a slot width distance 110.

The new and improved fastener 10 (FIGS. 1, 2 and 3) comprises a nut 10 having a depth, a width, a length longer than its width, opposite parallel longitudinal side surfaces 200 and 210, end surfaces 220 and 230, a top major face 240, and an opposite bottom major face 250 substantially perpendicular to the side surfaces 200 and 210. The nut 10 has parallel grooves 260 and 270 located on the top major face 240 perpendicular to the parallel longitudinal side surfaces 200 and 210. The parallel grooves 260 and 270 have flange engaging means 280 and 290, such as teeth like protrusions, therein for engaging the end portions 90 and 100 of the flanges 70 and 80 of the channeled structural member 20. The parallel grooves 260 and 270 are spaced apart and centered on the top major face 240 for co-acting with the flanges 70 and 80 of the channeled structural member 20. The longitudinal side surfaces 200 and 210 are contiguous with the end surfaces 220 and 230 forming a first and a second set of diagonally opposite corners 300, 310, 301 and 311. The first set of diagonally opposite corners 300 and 310 are foreshortened and are spaced apart by a first set diagonal dimension 20. The first set diagonal dimension 320 is sufficiently less than the distance between the parallel side sections 40 and 50 (FIG. 4) of the channeled structural member 20 to provide clearance between the first set of diagonally opposite corners 300 and 310 and the parallel side sections 40 and 50 during installation of the nut 10. The nut 10 has a centrally located bolt engaging means 330, such as a threaded hole, which can accept a bolt, such as a threaded bolt. The bolt engaging means 330 has an extended portion 340 above the top major face 240 of the nut 10. The extended portion 340 has two sets of opposite parallel extended sides 350, 360, 370, and 380. The two sets of opposite parallel extended sides 350, 360, 370 and 380 are contiguous with each other forming a third and a fourth set of diagonally opposite corners 390, 400, 410 and 420. The third set of diagonally opposite corners 390 and 400 are foreshortened and are spaced apart by a third set diagonal dimension 430. The third set diagonal dimension 430 is sufficiently less than the slot width distance 110 (FIG. 4) of the channeled structural member 20 to provide clearance between the third set of diagonally opposite corners 390 and 400 of the extended portion 340 and the flanges 70 and 80 of the channeled structural member 20 during installation of the fastener. The fourth set of diagonally opposite corners 410 and 420 co-act with the flanges 70 and 80 (FIG. 4) during the installation of the fastener providing an alignment of the parallel grooves 260 and 270 (FIG. 2) of the nut 10 with the end portions 90 and 100 of the flanges 70 and 80 of the channeled structural member 20.

Figure 5:
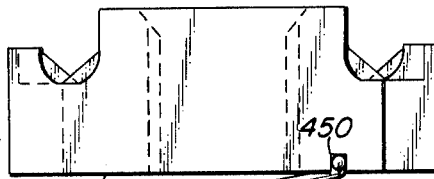
FIG. 5 is a side view of a fastener illustrating another embodiment of the present invention.
Figure 6:
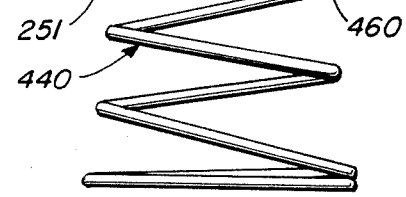
FIG. 6 is a bottom view of the fastener illustrated in FIG. 5.
Figure 6:
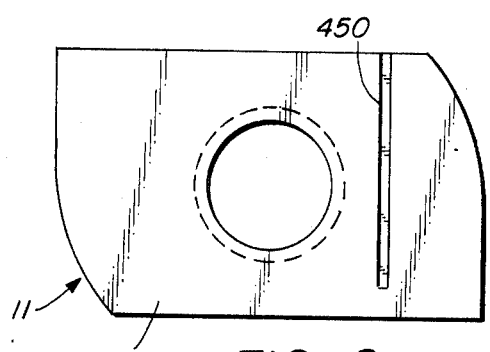

In another aspect of the invention, a nut 11, shown in FIGS. 5 and 6, is the same as nut 10, in addition it is provided with a spring 440 (FIG. 5), such as a compression spring, arranged normal to the bottom major face 251 (FIGS. 5 and 6) and is provided with a spring attachment means 450 (FIGS. 5 and 6) on the bottom major face 251 for attaching a tang 460 (FIG. 5) of the spring 440 to the nut 11.

Figure 7:
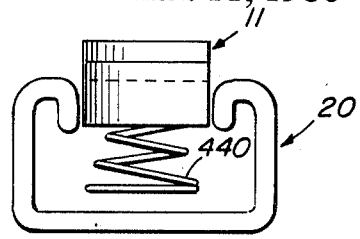
FIG. 7 is a cross sectional view, in part, of the fastener illustrated in FIG. 5 being positioned into a channeled structural member of limited depth as illustrated in FIG. 4.
Figure 8:
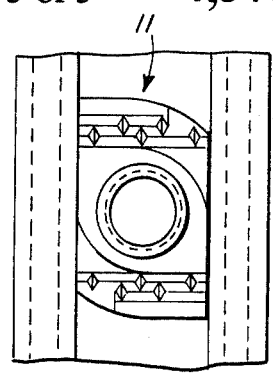
FIG. 8 is a top view of FIG. 7 illustrating relative position of the fastener of the present invention in relation to the channeled structural member of limited depth.
Figure 9:
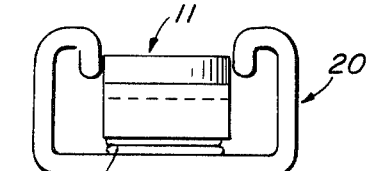
FIG. 9 is a view similar to FIG. 7 illustrating the position of the fastener of the present invention with attached spring compressed.
Figure 10:
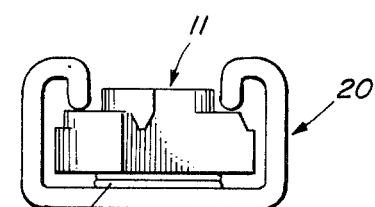
FIG. 10 is a view similar to FIG. 9 illustrating the position of the fastener of the present invention being rotated clockwise within the channeled structural member of limited depth.
Figure 11:
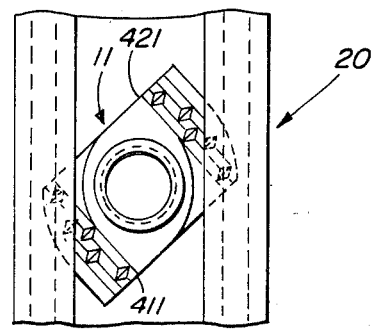
FIG. 11 is a top view of FIG. 10.
Figure 12:
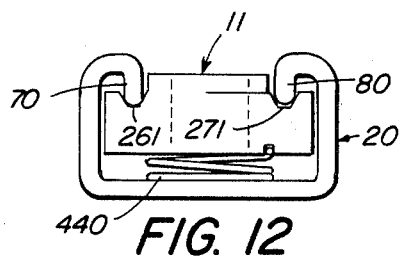
FIG. 12 is a view similar to FIG. 10 illustrating the position of the fastener of the present invention after rotation is completed within the channeled structural member of limited depth.
Figure 14:
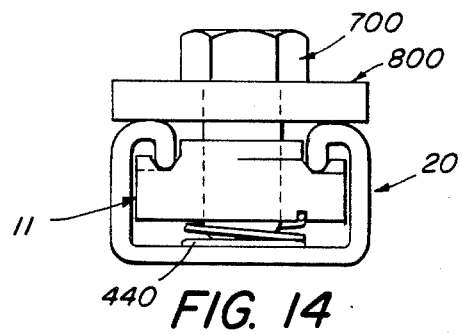
FIG. 14 is a view similar to FIG. 12 illustrating the attachment of a fixture to the channeled structural member by a bolt engaging with the fastener of the present invention.
Figure 13:
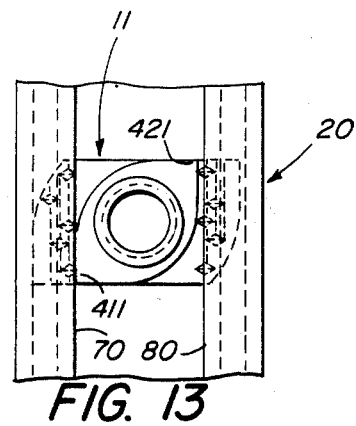
FIG. 13 is a top view of FIG. 12.

Shown in FIGS. 7-14 is a stepwise representation of a preferred embodiment of the present invention. As shown in FIGS. 7 and 8, nut 11 is inserted into a channeled structural member 20 having a limited depth. Nut 11 is then pressed down to compress spring 440 as shown in FIG. 9. Then nut 11 is rotated clockwise, as shown in FIGS. 10 and 11 until it is stopped by the co-acting of the fourth set of diagonally opposite corners 411 and 421 shown in FIGS. 11 and 13 with the flanges 70 and 80 shown in FIGS. 12 and 13 of channeled structural member 20 which aligns the grooves 261 and 271 shown in FIG. 12 with flanges 70 and 80. Once nut 11 is positioned, a fixture 800, such as a washer, shown in FIG. 14, can be attached to channeled structural member 20 by bolt 700 engaging with nut 11.

Figure 15:
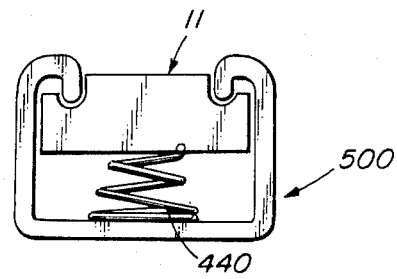
FIG. 15 is a cross sectional view in part of a preferred embodiment of the fastener of the present invention installed in a channeled structural member having a standard depth and width.

FIG. 15 illustrates a nut 11, a preferred embodiment of the present invention, installed in a channeled structural member 500 having a standard depth and width.

An example of a channeled structural member 500, FIG. 15, is a member having a width of 1⅝" and outside depth or height of 1⅝" but an inside depth of 1.2388" measured from the end portion of the flange to the bottom inside surface of the member [1.625" (outside depth of member)—0.105" (thickness of steel)—0.2812" (length of flange)]. The distance between the parallel side sections of the channeled structural member is 1.415" 1.625' (outside width)—0.105 (thickness of steel)×2]. The slot width is ⅞".

Figure 16:
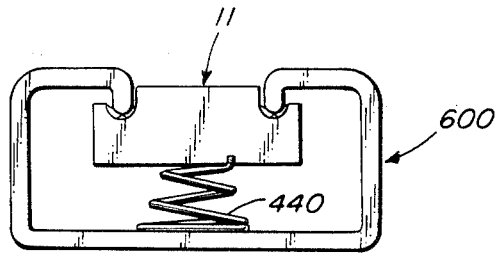
FIG. 16 is a cross sectional view, in part, of a preferred embodiment of the fastener of the present invention installed in a channeled structural member having a width greater than a standard channeled structural member as illustrated in FIG. 15.

FIG. 16 illustrates a nut 11, a preferred embodiment of the present invention, installed in a channeled structural member 600 having a width greater than channeled structural member 500 shown in FIG. 15.

Nuts 10 and 11, both embodiments of the present invention, can be used in channeled structural members having different widths and different depths such as channeled structural members 20, 500 and 600.

An example of nut 10 has a depth of 0.39", a width of 0.788" and length of 1.360", and extended portion of the bolt engaging means being 0.109" above the top major face, and an overall thickness of 0.499". The first set diagonal dimension of the nut 10 is less than 1.415" (the distance between the parallel side sections of the channeled structural member). The third set diagonal dimension of the nut 10 is less than ⅞" (the distance between the flanges of the channeled structural member), and the fourth set diagonal dimension is greater than ⅞".

An example of nut 11 would have the same dimensions as the example of nut 10 with the addition of a spring 440 attached to the bottom major face 251. The slot (spring attachment means 450) in the bottom major face 251 is 0.043" wide and 0.694" long and is peened over to attach the tang 460 of the spring 440, thereby holding the spring 440 to the nut 11.

The nuts 10 or 11 can be made by cold heading, hot forging, casting methods or powder metal briquetting and sintering process. The preferred method is by the powder metal briquetting and sintering process because the same set of dies can be used to make steel, aluminum, stainless steel and brass or copper fasteners.

While there have been shown and described what are at present believed to be the preferred embodiments of the invention, it will be obvious to those skilled in the art that various changes and modifications may be made therein without departing from the scope of the invention as defined by the appended claims.

What is claimed is:

1. A fastener in combination with a channeled structural member; said fastener being used for affixing parts to said channeled structural member; said combination comprising said channeled structural member having a depth, a width, a bottom section, two parallel side sections being spaced apart by a distance between said side sections, and a top section parallel with the bottom section, said top section having a longitudinal slot bordered by inwardly projecting flanges, said flanges each having an end portion, said flanges being spaced apart by a slot width distance and said fastener comprising a nut having a depth, a width, a length longer than its width, opposite parallel longitudinal side surfaces, end surfaces, a top major face, and an opposite bottom major face substantially perpendicular to said side surfaces, said nut having parallel grooves located on said top major face perpendicular to said parallel longitudinal side surfaces, said parallel grooves having flange engaging means therein for engaging said end portion of said flanges of said channeled structural member, said parallel grooves being spaced apart and centered on said top major face for co-acting with said flanges of said channeled structural member, said longitudinal side surfaces being contiguous with said end surfaces forming a first and a second set of diagonally opposite corners, said first set of diagonally opposite corners being foreshortened, said first set of diagonally opposite corners being spaced apart by a first set diagonal dimension, said first set diagonal dimension being sufficiently less than the distance between said parallel side sections of said channeled structural member to provide clearance between said first set of diagonally opposite corners and said parallel side sections during installation of said nut, said nut having a centrally located bolt engaging means having an extended portion above said top major face of said nut, said nut having an overall thickness equal to said depth of said nut plus said extended portion, said extended portion having two sets of opposite parallel extended sides, said two sets of opposite parallel extended sides being contiguous with each other forming a third and a fourth set of diagonally opposite corners, said third set of diagonally opposite corners being foreshortened, said third set of diagonally opposite corners being spaced apart by a third set diagonal dimension, said third set diagonal dimension being sufficiently less than said slot width distance of said channeled structural member to provide clearance between said third set of diagonally opposite corners of said extended portion and said flanges of said channeled structural member during installation of said nut, said fourth set of diagonally opposite corners co-acting with said flanges during the installation of said nut providing an alignment of said parallel grooves with said end portion of said flanges of said channeled structural member.

2. A nut in accordance with claim 1 wherein said flange engaging means are teeth like protrusions.

3. A nut in accordance with claim 1 wherein said bolt engaging means is threaded to accept a threaded bolt.

4. A fastener in combination with a channeled structural member; said fastener being used for affixing parts to said channeled structural member; said combination comprising said channeled structural member having a depth, a width, a bottom section, two parallel side sections, being spaced apart by a distance between said side sections, and a top section parallel with the bottom section, said top section having a longitudinal slot bordered by inwardly projecting flanges, said flanges each having an end portion, said flanges being spaced apart by a slot width distance; said fastener comprising a nut having a depth, a width, a length longer than its width, opposite parallel longitudinal side surfaces, end surfaces, a top major face, and an opposite bottom major face substantially perpendicular to said side surfaces, said nut having parallel grooves located on said top major face perpendicular to said parallel longitudinal side surfaces, said parallel grooves having flange engaging means therein for engaging said end portion of said flanges of said channeled structural member, said parallel grooves being spaced apart and centered on said top major face for co-acting with said flanges of said channeled structural member, said longitudinal side surfaces being contiguous with said end surfaces forming a first and a second set of diagonally opposite corners, said first set of diagonally opposite corners being foreshortened, said first set of diagonally opposite corners being spaced apart by a first set diagonal dimension, said first set diagonal dimension being sufficiently less than the distance between said parallel side sections of said channeled structural member to provide clearance between said first set of diagonally opposite corners and said parallel side sections during installation of said fastener, said nut having a centrally located bolt engaging means having an extended portion of said centrally located bolt engaging means above said top major surface of said nut, said nut having an overall thickness equal to said depth of said nut plus said extended portion, said extended portion having two sets of opposite parallel extended sides, said two sets of opposite parallel extended sides being contiguous with each other forming a third and a fourth set of diagonally opposite corners, said third set of diagonally opposite corners being foreshortened, said third set of diagonally opposite corners being spaced apart by a third set diagonal dimension, said third set diagonal dimension being sufficiently less than said slot width distance of said channeled structural member to provide clearance between said third set of diagonally opposite corners of said extended portion and said flanges of said channeled structural member during installation of said nut, said fourth set of diagonally opposite corners co-acting with said flanges during the installation of said nut providing an alignment of said parallel grooves with said end portion of said flanges of said channeled structural member;

a spring arranged normal to said bottom major face being attached to said nut by a spring attachment means located on said bottom major face for attaching a tang of said spring to said nut.

5. A nut in accordance with claim 4 wherein said flange engaging means are teeth like protrusions.

6. A nut in accordance with claim 4 wherein said bolt engaging means is threaded to accept a threaded bolt.

7. A nut in accordance with claim 4 wherein said spring attachment means is a peened over slot holding said tang of said spring.

* * * * *